US007774093B2

(12) United States Patent
Reese et al.

(10) Patent No.: US 7,774,093 B2
(45) Date of Patent: Aug. 10, 2010

(54) METHOD FOR OBTAINING A RANDOM SAMPLING

(75) Inventors: Margaret Reese, Tempe, AZ (US); Thomas Amonette, Greenfield, IN (US)

(73) Assignee: United States Postal Service, Washington, DC (US)

( * ) Notice: Subject to any disclaimer, the term of this patent is extended or adjusted under 35 U.S.C. 154(b) by 953 days.

(21) Appl. No.: 11/367,326

(22) Filed: Mar. 6, 2006

(65) Prior Publication Data

US 2006/0155419 A1 Jul. 13, 2006

Related U.S. Application Data

(60) Division of application No. 10/469,511, filed on Sep. 2, 2003, now Pat. No. 7,039,497, which is a continuation of application No. PCT/US02/05096, filed on Mar. 5, 2002.

(60) Provisional application No. 60/272,761, filed on Mar. 5, 2001.

(51) Int. Cl.
*G06F 7/00* (2006.01)

(52) U.S. Cl. .................................. 700/213; 700/219

(58) Field of Classification Search ................. 700/213, 700/219, 220, 223
See application file for complete search history.

(56) References Cited

U.S. PATENT DOCUMENTS

| | | | | |
|---|---|---|---|---|
| 4,713,769 | A | 12/1987 | Hills et al. | |
| 4,780,828 | A | 10/1988 | Whisker | |
| 4,796,180 | A | 1/1989 | Riley | |
| 5,042,667 | A | 8/1991 | Keough | |
| 5,079,714 | A | 1/1992 | Manduley et al. | |
| 5,119,306 | A | 6/1992 | Metelits et al. | |
| 5,142,482 | A | 8/1992 | Sansone | |
| 5,229,932 | A | 7/1993 | Connell et al. | |
| 5,373,115 | A | 12/1994 | Manduley et al. | |
| 6,009,416 | A * | 12/1999 | Pintsov | 705/410 |
| 6,390,756 | B1 * | 5/2002 | Isaacs et al. | 414/281 |
| 6,598,748 | B2 * | 7/2003 | Mileaf et al. | 209/542 |
| 2002/0082736 | A1 | 6/2002 | Lech | |

FOREIGN PATENT DOCUMENTS

| | | |
|---|---|---|
| DE | 4116150 | 11/1991 |
| JP | 2000048232 A | 2/2000 |
| WO | WO 02/070149 A2 | 9/2002 |

OTHER PUBLICATIONS

Lockhart, P., "Gaging Solutions For Today's Manufacturing Production," vol. 105, No. 11, pp. 30-32, Nov. 1993.

International Search Report in PCT/US02/05098, mailed on Sep. 18, 2002.

International Preliminary Examination Report in PCT/US02/05098, mailed on Jun. 8, 2003.

Written Opinion from the International Preliminary Examining Authority in PCT/US02/05098, mailed on Apr. 3, 2003.

International Search Report in PCT/US02/05096, mailed on Aug. 8, 2003.

* cited by examiner

*Primary Examiner*—Gene Crawford
*Assistant Examiner*—Ramya Prakasam
(74) *Attorney, Agent, or Firm*—Finnegan, Henderson, Farabow, Garrett & Dunner, L.L.P.

(57) ABSTRACT

The invention relates to a method of obtaining a random sample. The method includes randomly selecting a sample of a mailing at a DMU. This sample is then analyzed for conformance with United States Postal Service standards.

20 Claims, 4 Drawing Sheets

METHOD FOR OBTAINING A RANDOM SAMPLING

CROSS-REFERENCE TO RELATED APPLICATION

This is a divisional of, and claims the benefit of, U.S. application Ser. No. 10/469,511, filed Sep. 2, 2003 now U.S. Pat. No. 7,039,497, which was the National Stage of International Application No. PCT/US02/05096, filed Mar. 5, 2002, which claims the benefit of U.S. Provisional Application No. 60/272,761, filed Mar. 5, 2001, all of which are hereby incorporated herein by reference.

BACKGROUND

Currently, many companies that generate a large amount of outgoing mail have their mail verified and accepted by the United States Postal Service ("USPS") at their mail production facilities rather than delivering it to a post office for acceptance processing. These in-house verification and acceptance centers are often referred to as Detached Mail Units ("DMU"). Typically, the company will present one or more mailings to a DMU where they will be processed and sent for delivery. These companies are responsible for reporting information regarding the mailing to USPS and for insuring that the mailing conforms to USPS standards. This includes insuring that the barcode information, sort information, and/or rate information is accurate and conforms to USPS standards.

USPS periodically sends postal clerks to the DMUs to verify that the mailer provided accurate information and that the mailing comports with USPS standards. Typically, an automated verification device, such as a Mailing Evaluation Readability Lookup Instrument ("MERLIN"), is used to verify large amounts of mail efficiently. In most cases, rather then check the entire mailing, the clerk selects a random sample of each mailing and uses that sample to verify the entire mailing. In order for the sample to be an accurate representation of the entire mailing, however, it must be a statistically valid random sample. Providing a standard procedure for a clerk to obtain such a sample has proven difficult because of the fact that each mailing may have different properties.

For example, mailings prepared at DMUs can vary by size, location, type of mail, and ordering. With respect to size, a company may process small, medium, or large mailings. The size of the mailing alters the amount of mail need for a statistically valid random sample.

With respect to location, a mailing may reside in several locations throughout the DMU. When a clerk arrives to verify a mailing, it may be in processing, stored on the floor, or already partially delivered. These locations must also be taken into account in determining a statistically valid random sample.

With respect to type of mail, a mailer may mail letters, flats, packages, or a combination of all three. A letter mailer generally works with large volumes of letter mail. A flat mailer generally works with magazines, catalogues, and other "flat" mail. This may affect the amount of mail that needs to be sampled. Therefore, this also must be taken into account in determining a statistically valid random sample.

With respect to ordering, a mailer may also be a "list mailer." Mail from list mailers is presorted by computer based on a predetermined order. Other mailers, however, may use optical scanners and bar code sorters. In this case, the order of the mail cannot be determined until the mail has been sorted. The ordering of the mail may also affect the choice of a statistically valid random sample.

These variations make it difficult for a clerk to apply a single random sampling method to different mailings. Therefore, it is desirable to provide a method for obtaining a random sampling that takes into account these variations.

SUMMARY

Methods in accordance with an embodiment of the invention provide a method of obtaining a random sample from a plurality of mail pieces. The method comprises determining at least one of the following for the plurality of mail pieces: the type of mail pieces and the number of mail pieces in the plurality of mail pieces. The method also comprises determining the location of the mail pieces, determining a random sample of mail pieces based on at least one of the type of mail pieces and the number of mail pieces, specifying the location of the mail pieces in the random sample, and pulling the random sample of mail pieces from the plurality of mail pieces.

Systems in accordance with an embodiment of the invention provide a system for obtaining a random sample from a plurality of mail pieces. The system comprises a first determining component configured to determine at least one of the following for the plurality of mail pieces: the type of mail pieces and the number of mail pieces in the plurality of mail pieces. The system also comprises a second determining component configured to determine the location of the mail pieces, a third determining component configured to determine a random sample of mail pieces based on at least one of the type of mail pieces and the number of mail pieces, a specifying component configured to specify the location of the mail pieces in the random sample, and a pulling component configured to pull the random sample of mail pieces from the plurality of mail pieces.

Systems in accordance with another embodiment of the invention provide a computer readable medium containing instructions for controlling a computer system to perform a method of obtaining a random sample from a plurality of mail pieces. The method comprises determining at least one of the following for the plurality of mail pieces: the type of mail pieces and the number of mail pieces in the plurality of mail pieces. The method also comprises determining the location of the mail pieces, determining a random sample of mail pieces based on at least one of the type of mail pieces and the number of mail pieces, specifying the location of the mail pieces in the random sample, and pulling the random sample of mail pieces from the plurality of mail pieces.

Systems in accordance with another embodiment of the invention provide a system for obtaining a random sample from a plurality of mail pieces. The system comprises a first determining means for determining at least one of the following for the plurality of mail pieces: the type of mail pieces and the number of mail pieces in the plurality of mail pieces. The system also comprises a second determining means for determining the location of the mail pieces, a third determining means for determining a random sample of mail pieces based on at least one of the type of mail pieces and the number of mail pieces, a specifying means for specifying the location of the mail pieces in the random sample, and a pulling means for pulling the random sample of mail pieces from the plurality of mail pieces.

Methods in accordance with another embodiment of the invention provide a method of verifying mail information. The method comprises presenting a plurality of mail pieces to a mail unit and determining at least one of the following for the plurality of mail pieces: the type of mail pieces and the number of mail pieces in the plurality of mail pieces. The method also comprises determining the location of each mail piece, determining a random sample of mail pieces based on at least one of the type of mail pieces and the number of mail pieces, specifying the location of the mail pieces in the random sample, pulling the random sample of mail pieces from the plurality of mail pieces, and verifying the random sample of mail pieces for conformance with a specified standard.

Systems in accordance with another embodiment of the invention provide a system for verifying mail information comprising a presenting component configured to present a plurality of mail pieces to a mail unit, a first determining component configured to determine at least one of the following for the plurality of mail pieces: the type of mail pieces and the number of mail pieces in the plurality of mail pieces, a second determining component configured to determine the location of each mail piece, a third determining component configured to determine a random sample of mail pieces based on at least one of the type of mail pieces and the number of mail pieces, a specifying component configured to specify the location of the mail pieces in the random sample, a pulling component configured to pull the random sample of mail pieces from the plurality of mail pieces, a verifying component configured to verify the random sample of mail pieces for conformance with a specified standard.

Systems in accordance with another embodiment of the invention provide a computer readable medium containing instructions for controlling a computer system to perform a method of verifying mail information. The method comprises presenting a plurality of mail pieces to a mail unit, determining at least one of the following for the plurality of mail pieces the type of mail pieces and the number of mail pieces in the plurality of mail pieces, determining the location of each mail piece, determining a random sample of mail pieces based on at least one of the type of mail pieces and the number of mail pieces, specifying the location of the mail pieces in the random sample, pulling the random sample of mail pieces from the plurality of mail pieces, and verifying the random sample of mail pieces for conformance with a specified standard.

Systems in accordance with another embodiment of the invention provide a system for verifying mail information comprising a presenting means for presenting a plurality of mail pieces to a mail unit, a first determining means for determining at least one of the following for the plurality of mail pieces: the type of mail pieces and the number of mail pieces in the plurality of mail pieces, a second determining means for determining the location of each mail piece, a third determining means for determining a random sample of mail pieces based on at least one of the type of mail pieces and the number of mail pieces, a specifying means for specifying the location of the mail pieces in the random sample, a pulling means for pulling the random sample of mail pieces from the plurality of mail pieces, and a verifying means for verifying the random sample of mail pieces for conformance with a specified standard.

Methods in accordance with another embodiment of the invention provide a method of determining whether to obtain a sample from a plurality of mail pieces. The method comprises determining at least one of the following for the plurality of mail pieces: the type of mail pieces, the number of mail pieces in the plurality of mail pieces, and the entity who prepared the plurality of mail pieces. The method also comprises assigning a risk factor to the plurality of mail pieces based on one of the type of mail pieces, the number of mail pieces in the plurality of mail pieces, and the entity who prepared the plurality of mail pieces, and obtaining a sample number of mail pieces if the risk factor exceeds a predetermined risk level.

Systems in accordance with another embodiment of the invention provide a system for determining whether to obtain a sample from a plurality of mail pieces. The system comprises a determining component configured to determine at least one of the following for the plurality of mail pieces: the type of mail pieces, the number of mail pieces in the plurality of mail pieces, and the entity who prepared the plurality of mail pieces. The system also comprises an assigning component configured to assign a risk factor to the plurality of mail pieces based on one of the type of mail pieces, the number of mail pieces in the plurality of mail pieces, and the entity who prepared the plurality of mail pieces, and an obtaining component configured to obtain a sample number of mail pieces if the risk factor exceeds a predetermined risk level.

Systems in accordance with another embodiment of the invention provide for a computer readable medium containing instructions for controlling a computer system to perform a method of determining whether to obtain a sample from a plurality of mail pieces. The method comprises determining at least one of the following for the plurality of mail pieces: the type of mail pieces, the number of mail pieces in the plurality of mail pieces, and the entity who prepared the plurality of mail pieces. The method also comprises assigning a risk factor to the plurality of mail pieces based on one of the type of mail pieces, the number of mail pieces in the plurality of mail pieces, and the entity who prepared the plurality of mail pieces, and obtaining a sample number of mail pieces if the risk factor exceeds a predetermined risk level.

Systems in accordance with another embodiment of the invention provide for a system for determining whether to obtain a sample from a plurality of mail pieces, comprising a determining means for determining at least one of the following for the plurality of mail pieces: the type of mail pieces, the number of mail pieces in the plurality of mail pieces, and the entity who prepared the plurality of mail pieces, an assigning means for assigning a risk factor to the plurality of mail pieces based on one of the type of mail pieces, the number of mail pieces in the plurality of mail pieces, and the entity who prepared the plurality of mail pieces, and an obtaining means for obtaining a sample number of mail pieces if the risk factor exceeds a predetermined risk level.

Additional aspects of the invention are disclosed and defined by the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

In the drawings.

DESCRIPTION OF THE EMBODIMENTS

Methods and systems in accordance with the present invention provide methods of and systems for obtaining a random sampling. In one implementation, the method will be computer program, which may be referred to as a "random selection sampling program." The random selection sampling program will help the clerk to randomly select statistically accurate samples from mailings at DMU to verify a mailing.

Figure 1:
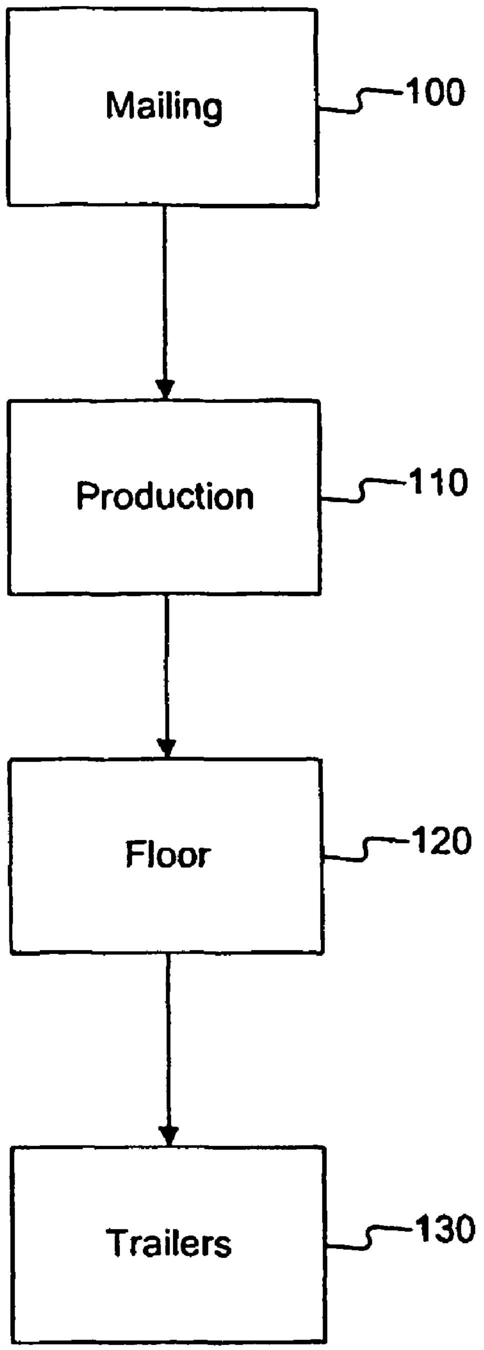
FIG. 1 is a flow diagram illustrating the processing stages of a mailing in accordance with one embodiment of the invention.

FIG. 1 is a flow diagram illustrating the processing stages of a mailing in accordance with one embodiment of the invention. As shown in FIG. 1, a mailing 100 is first placed in production 110. In one implementation, production 110 includes the printing, processing, barcoding, and sorting of mailing 100. Following production 110, mailing 100 is placed on floor 120. In one implementation, floor 120 may be a staging area for mail prior to verification. Next, mailing 100 is moved from floor 120 to trailers 130. In one implementation, trailers 130 include vehicles to deliver mailing 100. These implementations are merely exemplary, and other implementations may also be used.

When a clerk arrives at a DMU to take a random sample of mailing 100 for verification, mailing 100 may be in any one of stages 110, 120, and 130 or may be spread out among stages 110, 120, and 130. In order to take a statistically accurate random sampling, a random selection sampling program will need to have the opportunity to choose a sample from each of these stages. These implementations are merely exemplary and other implementations may also be used.

Figure 2:
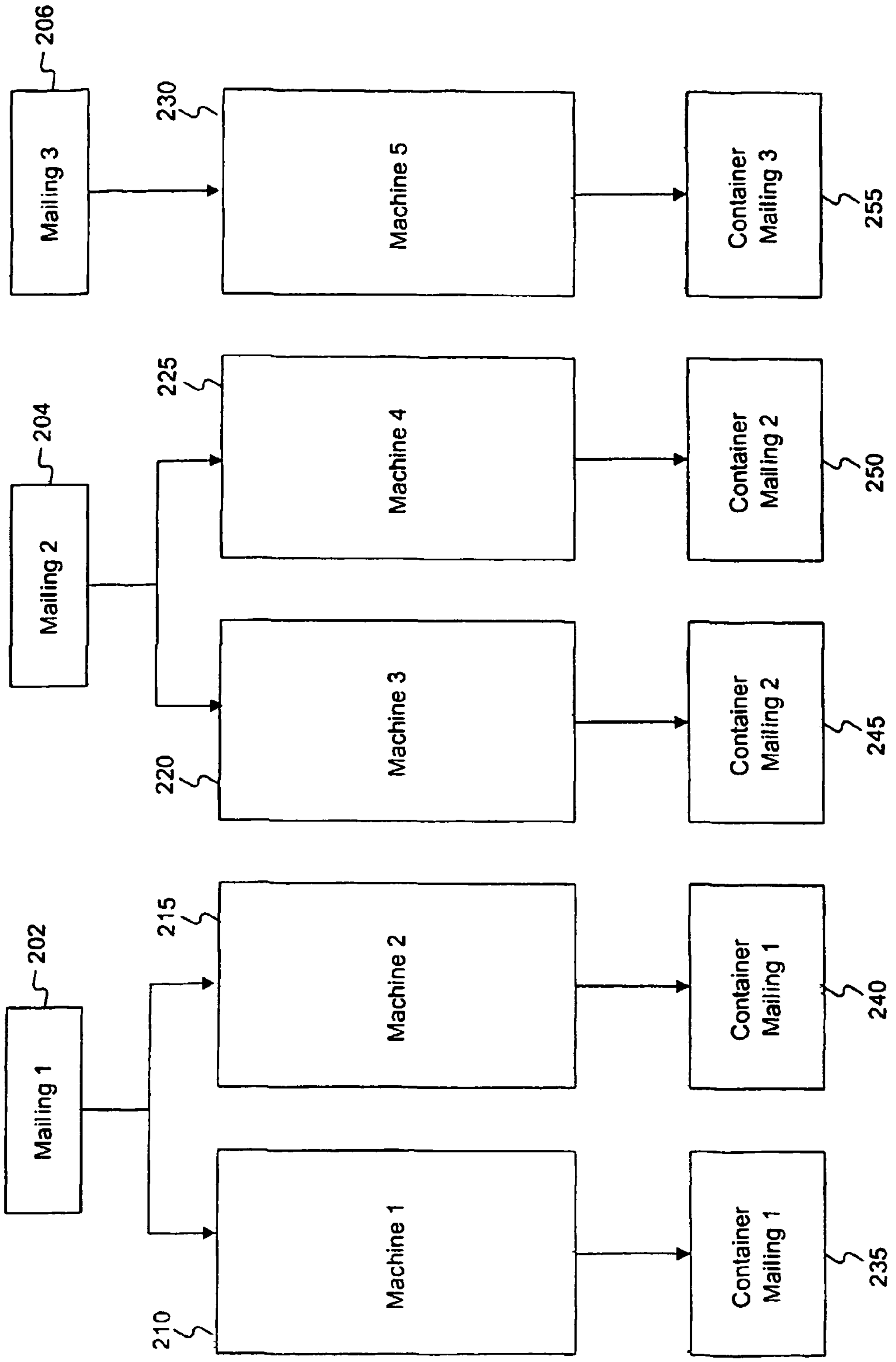
FIG. 2 illustrates a production stage at a DMU in accordance with an embodiment of the invention.

FIG. 2 illustrates a production stage at a DMU in accordance with an embodiment of the invention. As described in FIG. 1, a mailing begins in the production stage. During the production stage, the mailing may be printed and placed in envelopes in preparation for mailing. In one implementation, as shown in FIG. 2, a mailer's plant may comprise five production machines, such as Machine 1 210, Machine 2, 215, Machine 3 220, Machine 4 225, and Machine 5 230. A production operation, however, may comprise any number of production machines.

In this implementation, a mailing 1 202 has been placed in machine 1 210 and machine 2 215, a mailing 2 204 has been placed in machine 3 220 and machine 4 225, and a mailing 3 206 has been placed in machine 5 230. Any mailing may be placed in any machine. Following processing in the machines, the mailings are placed in containers to await verification. As shown in FIG. 2, machine 1 210 and machine 2 215 place a portions of mailing 1 202 in containers 235 and containers 240, respectively. Likewise, machine 3 220 and machine 4 225 are placing portions of mailing 2 204 in containers 245 and containers 250, and machine 5 is placing mailing 3 206 in container 255. Containers 235, 240, 245, 250, 255 may include mail sacks, trays, or any other type of container. In one implementation, containers 235, 240, 245, 250, 255 containers then are moved to a staging area. These implementations are exemplary, and other implementations may also be used.

In one implementation, in order for a clerk to take a sample of a mailing that is either partially or wholly in production, the clerk will survey each of the machines to determine what mail is in production and how long the mail will be in production on each of the machines. This information will be used to determine a random sample. This implementation is exemplary, and other implementations may also be used.

Figure 3:
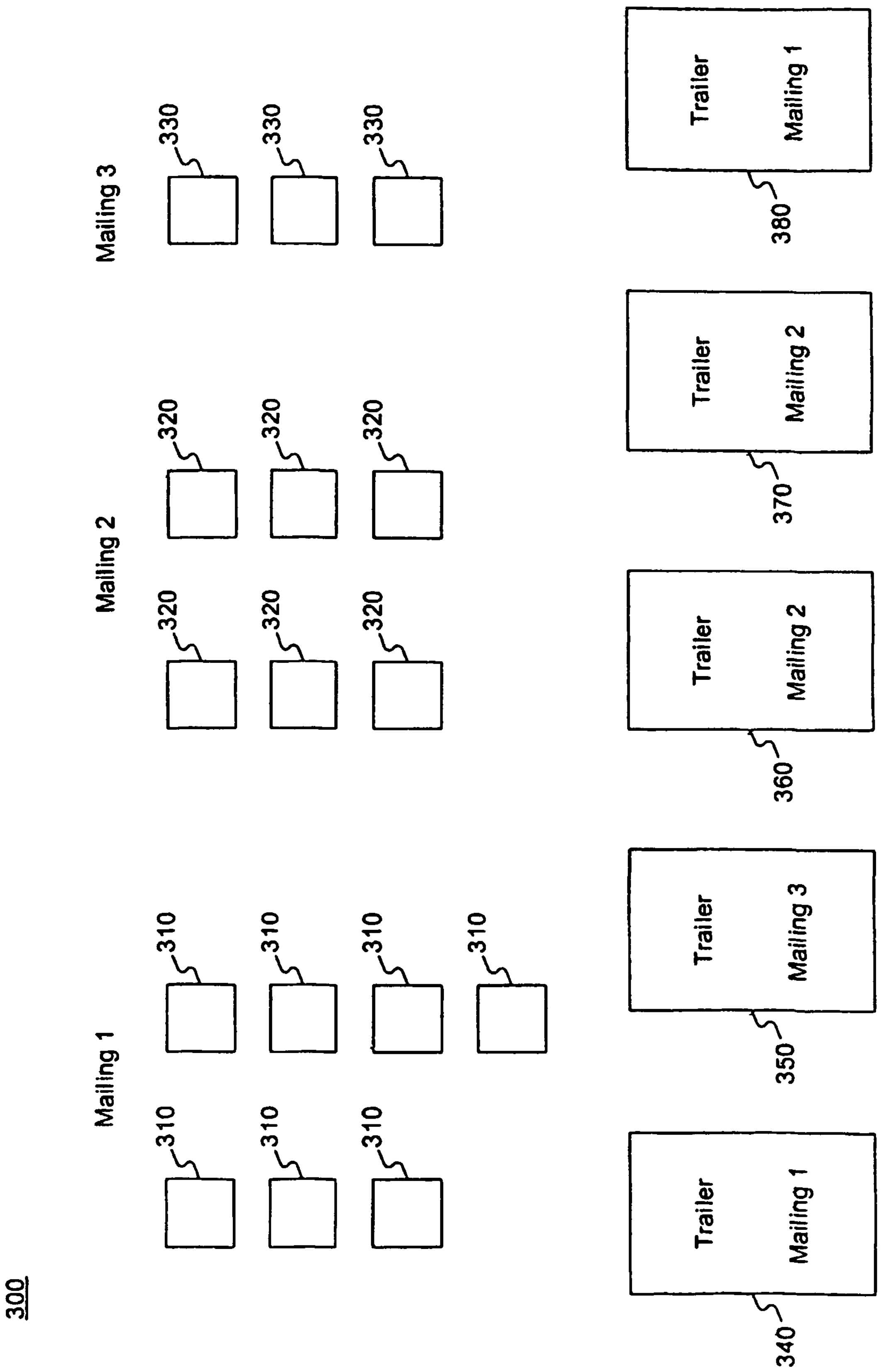
FIG. 3 illustrates a floor and trailer stage at a DMU in accordance with an embodiment of the invention.

FIG. 3 illustrates a floor and trailer stage at a DMU in accordance with an embodiment of the invention. As shown in FIG. 3, following production, mailings may be staged on the floor in containers 310, 320, and 330. In one implementation, mailing 1 is contained in containers 310, mailing 2 is contained in containers 320, and mailing 3 is contained in containers 330. In this implementation, the clerk will determine the amount of mail staged in containers on the floor. This information will be used in determining a random sample. This implementation is exemplary, and other implementations may also be used.

From the floor, a mailing may be moved to vehicles. As shown in FIG. 3, trailer 340 and trailer 380 contain containers for mailing 1, trailer 360 and trailer 370 contain containers for mailing 2, and trailer 350 contains containers for mailing 3. In one implementation, the clerk will determine the amount of mail staged in trailers. This information will be used to determine a random sample. This implementation is exemplary, and other implementations may also be used.

As shown in FIGS. 1-3, a mailing at a DMU may be located in production, in containers on the floor, and/or in containers in a trailer. In order to provide an accurate sample, a random selection sampling program will need to include mail located in all of these locations in the pool from which to take the sample.

Figure 4:
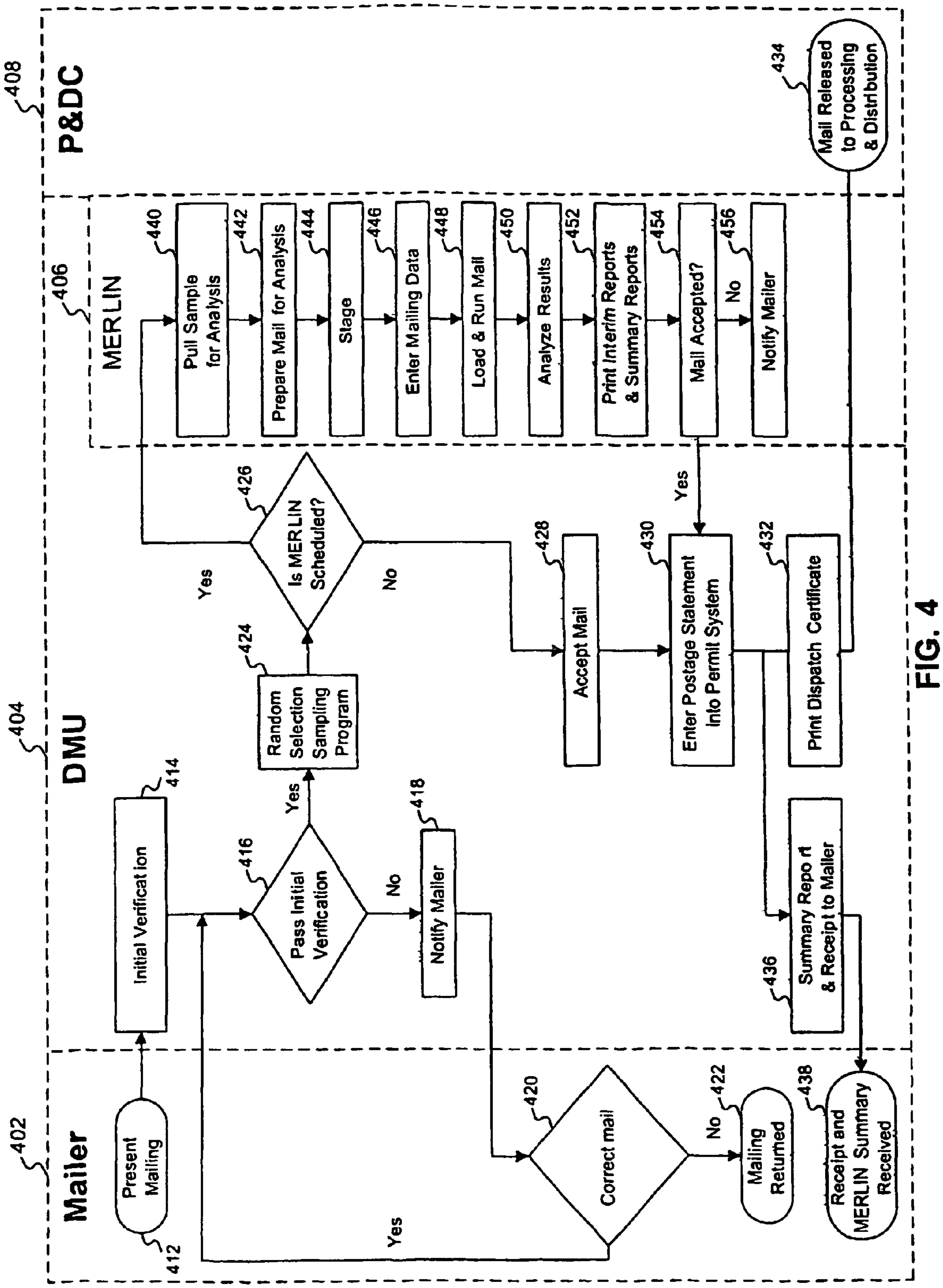
FIG. 4 is a flow chart illustrating the verification of mail at a DMU in accordance with one embodiment of the invention.

FIG. 4 is a flow chart illustrating the verification of mail at a DMU in accordance with one embodiment of the invention. As shown in FIG. 4, the process comprises four parts: Mailer 402, DMU 404, MERLIN 406, and Processing and Delivery Center ("P & DC") 408. Mailer 402 includes functions to be performed by the mailer. DMU 404 includes functions performed at the detached mail unit. MERLIN 406 includes functions performed by MERLIN, or some other mail verification device at the DMU. P & DC 408 includes functions performed at the processing and delivery center. This implementation is merely exemplary, and other implementations may also be used.

The process begins with present mailing 412. Present mailing 412 includes the presentation of the mailing mail at the DMU. Next, USPS will conduct an initial verification 414.

Initial verification 414 includes determining information regarding the amount and type of mail in a mailing. This information will then be compared with information provided by the mailer. In one implementation, the clerk will use a worksheet to record the number of mailings at the DMU, the amount of mail in each mailing, the type of mail in each mailing, and the location of the mail in each mailing. For example, in the implementation shown in FIG. 2 and FIG. 3, the clerk would record that there were three mailings: mailing 1 202, mailing 2 204, and mailing 3 206. The clerk would then record the amount of mail in machine 1 210, machine 2 215, machine 3 220, machine 4 225, and machine 5 230. Next, the clerk would record the amount of mail in containers 235, 240, 245, 250, and 255. The clerk will then record the amount of mail located on the floor in containers 310, 320, and 330. Finally, the clerk will determine the amount of mail in trailers 340, 350, 360, 370, and 380.

In another implementation, the clerk may also record the type of mail in each of these mailings and the type of mail at each location. The type of mail may be important in determining how many units are to be sampled. In one implementation, rather than counting the amount of mail in each location, the amount of mail will be recorded in terms of a unit, such as trays, sacks, or containers. However, the number of mail pieces in the unit may vary depending on the type of mail. For example, a tray of letter mail can hold up to about 400 pieces, but a tray of flat mail may only hold 90 pieces. Likewise, a sack of flat mail may hold about 125 pieces depending on the volume of the mail. Packages, on the other hand, may be kept in containers, which may only hold a few pieces. Therefore, when entering in a unit, the clerk must also enter in the type of mail, so that the random selection sampling program has an accurate picture of the amount of mail in a mailing.

In one implementation, after determining the amount, type, and location of the mailing, the clerk will obtain postage statements from the mailer regarding the mailing. These postage statements may include information regarding the amount and type of the mailing as reported by the mailer. The clerk will then compare the information provided by the mailer to that determined during the verification. The initial verification may also include determining if the bulk fees are paid and if funds are available for each mailing. If the information provided by the mailer is inaccurate, then the mailing does not pass initial verification 416. If the information provided by the mailer is accurate, then the mailing does pass initial verification 416.

If the mailing does not pass initial verification 416, the next stage is notify mailer 418. Notify mailer 418 includes informing the mailer of the deficiencies in the information provided by the mailer or in the funds available for the mailing. The next stage is correct mail 420. Correct mail 420 includes correcting the information regarding the mailing and may include the payment of additional postage fees. If the mailer corrects the errors, the mail will again be returned to initial verification 414. If the mailer does not correct any errors, then the mailing is returned 422.

If the mailing does pass initial verification, then the next stage is to run the random selection sampling program 424. Random selection sampling program 424 includes entering the mail information determined during initial verification 414 into random selection sampling program 424. Random selection sampling program will then determine a sample of the mailing to verify mailing information.

In one implementation, the clerk will enter the mail information determined during initial verification 414 into a computer that will run random selection sampling program 424. In one implementation, random selection sampling program 424 can receive information from a clerk by prompting through a series of questions. In another implementation, the clerk will also enter information regarding the amount of time available for sampling that day. Because the clerk may work at a DMU for only a couple hours a day or may only have a limited amount of time available to sample the mailing, the program may need to take the time available into account when determining a sample size. These implementations are merely exemplary, and other implementations may also be used.

Next, random selection sampling program 424 will determine what mailings need to be sampled and when to sample. Based on the clerk's schedule, the program will determine the amount of mail to be sampled, what mail to sample, the location of that mail, and when to sample the mail. In one implementation, the sample size will be determined based on the size of the mailing.

For example, in one implementation, if the mailing comprises less than 10,000 mail pieces, the sample size may, for example, be 500 mail pieces. If the mailing comprises more than 10,000 mail pieces, the sample size may, for example, be 1,000 mail pieces. In this implementation, random selection sampling program 424 will choose samples in blocks of 250 mail pieces. For example, if the sample comprises 500 pieces, random selection sampling program 424 will randomly select two locations from which to take 250 pieces each. Likewise, if the sample comprises 1000 pieces, random selection sampling program 424 will randomly select four locations from which to take 250 pieces each. These locations will be chosen randomly based on the information inputted by the clerk and may include mail in production, mail staged on the floor, or mail in trailers. The sample may also specify locations in certain containers. In another implementation, random selection sampling program 424 may choose random samples only from mail that is in production. These implementations are merely exemplary, and other implementations and other sample sizes may also be used.

In another implementation, the program will also determine if there are any risk factors associated with each of the jobs. For example, the mail may be of a single product which will have substantially identical features, for example, a magazine or catalog. In this instance, there are not significant variations between the mail pieces. For example, there would be little variation in weight for a particular magazine. However, in a presort environment, where a mailer picks up letter mail from hundreds of different customers, there may be significant variation in the mail. This variation creates greater risk. The risk may be used in deciding whether and how often a mailing needs to be sampled. The program may also need to know the volume of the job for the day. If the mailing is small, USPS will be at a lesser risk of revenue loss than for a large mailing. For example, there is less risk of revenue loss in accepting a 10,000 piece mailing compared to a million piece mailing. USPS may also want to include a risk factor for each mailer, based on the mailer's history of compliance with USPS requirements. The program may include all or some of the various risks described above, to determine an overall risk. This risk may be used in deciding whether and how often a mailing needs to be sampled.

In another implementation, mail that is staged and mail that is in production will be sampled separately and treated as separate mailings. In another implementation, the results of the samplings will be merged to obtain a single result. Using this approach, a weighting factor may be used. These implementations are merely exemplary, and other implementations may also be used.

In another implementation, the random selection sampling program may also show how to expand the sample if additional units are needed. Also, there may be situations where more mailings are selected for sampling than the clerk actually has time to sample. This may be because of restrictions in the clerk's work day or the unavailability of the mailings at an appropriate time, i.e., the mailing that USPS thought was going to be ready at a particular time was not ready. In these instances, the program can scale down the sampling, or the number of mailings to be sampled.

Following random selection sampling program 424, the clerk determines if MERLIN is scheduled 424. As described above, MERLIN is an automated verification system. MERLIN verifies barcode information, sort information, and/or rate information to determine if a mailer accurately reported this information and to determine if the mailing comports with USPS standards. Other verification systems may also be used.

If the mailing is not to be verified, the next stage is accept mail 428. Accept mail 428 includes accepting the mail for delivery. The next stage is then to enter postage statement into permit system 430. Enter postage statement into permit system 430 includes entering the rate, barcode, and sort information provided by the mailer regarding the mailing. Based on this information, the next stage is to print dispatch certificate 432. A dispatch certificate may include the rate, barcode, and sort information. Finally, the mail is released to processing and distribution 434.

If the mailing is to be verified, the sample description chosen by random selection sampling program 424 will be outputted to the clerk. With respect to mail in production, the program output will instruct the clerk what mailing to sample, what machine to sample, and when to sample. In one implementation, the program may break down time into ten minute segments. For example, in FIG. 2, the program may instruct the clerk to pull a sample from machine 5 at 10 minutes after the hour. These implementations are merely exemplary and other implementations may also be used.

With respect to mail located on the floor of the DMU or in a mail vehicle, as shown in FIG. 3, the random selection sampling program will identify which containers and vehicles to sample from. For example, in one implementation, the random selection sampling program may identify two containers 310, a single container 310, and/or a subset of mail pieces in container 310. These implementations are merely exemplary, and other implementations may be used.

In one implementation, rather than trying to have the clerk sample from multiple locations at the same time, it might be preferable to have the clerk sample the staged mail at one time, the production mail at another time, and ultimately combine that information together.

The clerk will then pull the mail sample for analysis out 440. Pull sample for analysis 440 includes physically removing a subset of mail pieces, as specified by random selection sampling program 424. The subset, or sample, will then be prepared and staged for analysis by MERLIN 442, 444. Next, the clerk will enter mailing data 446. Enter mailing data 446 includes entering the data about the mailing into MERLIN, including tray label information and a description of the mail 446.

The next stage is load & run mail 446. Load & run mail 446 includes loading and running the sample in MERLIN. Next, MERLIN will analyze the results 450. Analyze the results 450 includes determining if the mailing conforms with USPS standards and if the mailer accurately reported the mail information, as described more completely in U.S. patent application Ser. No. 10/297,849, entitled Method for Continuous Sampling of Mail, filed Dec. 11, 2002.

Following analyze results 450, MERLIN will print interim reports and summary reports 452 detailing the results of analyze results 450. Each of these reports reflects the results on a particular sample of mail, and can be combined to get an overall report for the mailing. In one implementation, USPS may sample the mailing multiple times, or may be sampling different segments. If the mailing passes the MERLIN verification process, the mail will be accepted 454 and the mail will move to enter the postage statement into permit system 430, followed by print dispatch certificate 432, and releasing the mail for distribution. If it does not pass, the mailer will be notified 456.

In one implementation, the random selection sampling program may be integrated within a verification device, such as MERLIN. In another implementation, this program may reside on a separate device. By putting the program on MERLIN or a similar device, it would be possible to have a single device that can handle the random sampling of mailings as well as performing in-depth analysis on the mailings. In another implementation, the random selection sampling program may be implemented using any suitable software or programming languages. For example, the program could be implemented using Excel, Access, or Visual Basic, among others. These implementations are merely exemplary, and other implementations may be used.

The random selection sampling program can also be used outside of DMUs, such as in Business Mail Entry Units ("BMEU"). The program could be used in other industries where sampling of production is done to determine whether quality standards are being met. It could also be used by purchasers who want to determine if the products they purchase are meeting their quality standards.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of determining whether to obtain a sample from a plurality of delivery items, the method comprising:

determining, using a computer, at least one of the following for the plurality of delivery items:

a type of delivery item, a number of delivery items in the plurality of delivery items, and an entity that prepared the plurality of delivery items;

assigning, using the computer, a risk factor to the plurality of delivery items based on one of: the type of delivery item, the number of delivery items, and the entity; and obtaining a sample number of delivery items if the risk factor exceeds a predetermined risk level.

2. The method of claim 1, wherein obtaining the sample number of delivery items comprises:

determining a set of locations for the plurality of delivery items;

determining a quantity of delivery items for the sample number based on at least one of:

the type of delivery item and the number of delivery items;

specifying a location from the set of locations; and obtaining at least a portion of the determined quantity of delivery items at the location.

3. The method according to claim 2, wherein the plurality of delivery items includes at least one of: letters, flats, and packages.

4. The method according to claim 2, wherein the set of locations includes a production line.

5. The method according to claim 2, wherein the set of locations includes a staging area.

6. The method according to claim 2, wherein the set of locations includes a delivery vehicle.

7. The method of claim 2, further comprising:

determining an amount of time available to obtain the sample number of delivery items.

8. The method of claim 7, wherein obtaining the sample number comprises:

determining a quantity of delivery items for the sample number based on at least one of:

the type of delivery item, the number of delivery items, and the amount of time available to obtain the sample number of delivery items.

9. The method of claim 1, further comprising:

analyzing the obtained sample number of delivery items for conformance with a standard.

10. A system for determining whether to obtain a sample from a plurality of delivery items, comprising:

a determining component that determines at least one of the following for the plurality of delivery items:

a type of delivery item, a number of delivery items in the plurality of delivery items, and an entity that prepared the plurality of delivery items;

a computer that assigns a risk factor to the plurality of delivery items based on one of: the type of delivery item, the number of delivery items, and the entity; and an obtaining component that obtains a sample number of delivery items if the risk factor exceeds a predetermined risk level.

11. The system of claim 10, wherein the obtaining component comprises:

a location determining component that determines a set of locations for the plurality of delivery items;

a sample-size determining component that determines a quantity of delivery items for the sample number based on at least one of:

the type of delivery item and the number of delivery items;

a specifying component that specifies a location from the set of locations; and a separating component that separates at least a portion of the determined quantity of delivery items from the plurality of delivery items at the location.

12. The system of claim 11, wherein the plurality of delivery items includes at least one of: a letter, a flat, and a package.

13. The system of claim 11, wherein the set of locations includes a production line.

14. The system of claim 11, wherein the set of locations includes a staging area.

15. The system of claim 11, wherein the set of locations includes a delivery vehicle.

16. The system of claim 11, further comprising:

a time determining component that determines an amount of time available to obtain the sample number of delivery items.

17. The system of claim 16, wherein the sample-size determining component determines a quantity of delivery items for the sample number based on at least one of:

the type of delivery item, the number of delivery items, and the amount of time available to obtain the sample number of delivery items.

18. The system of claim 11, further comprising:

a weighing component for determining whether a delivery item from the obtained sample number of delivery items conforms with a weight standard.

19. A computer readable medium storing instructions for controlling a computer system to perform a method of determining whether to obtain a sample from a plurality of delivery items, the method comprising:

determining at least one of the following for the plurality of delivery items:

a type of delivery item, a number of delivery items in the plurality of delivery items, and an entity that sent the plurality of delivery items;

assigning a risk factor to the plurality of delivery items based on one of: the type of delivery items, the number of delivery items, and the entity that sent the plurality of delivery items;

determining whether the risk factor exceeds a predetermined risk threshold; and providing an indication that a sample of delivery items from the plurality of delivery items should be examined if the risk factor exceeds the predetermined risk threshold.

20. A system for determining whether to obtain a sample from a plurality of delivery items, comprising:

a means for determining at least one of the following for the plurality of delivery items:

a type of delivery item, a number of delivery items in the plurality of delivery items, and an entity that prepared the plurality of delivery items; and a computer for:

assigning a risk factor to the plurality of delivery items based on one of: the type of delivery items, the number of delivery items, and the entity that prepared the plurality of delivery items, and determining whether the risk factor exceeds a predetermined risk threshold; and a means for obtaining a sample of delivery items from the plurality of delivery items if the risk factor exceeds the predetermined risk threshold.

* * * * *